United States Patent
Pang et al.

(10) Patent No.: US 8,924,560 B2
(45) Date of Patent: Dec. 30, 2014

(54) OPTIMIZED GAME SERVER RELOCATION ENVIRONMENT

(75) Inventors: Jeffrey Pang, Jersey City, NJ (US); Matthew Caesar, Buffalo Grove, IL (US); Virajith Jalaparti, Champaign, IL (US); Seungjoon Lee, Basking Ridge, NJ (US); Jacobus Van Der Merwe, New Providence, NJ (US)

(73) Assignees: AT&T Intellectual Property I, L.P., Atlanta, GA (US); The University of Illinois, Urbana, IL (US)

( * ) Notice: Subject to any disclaimer, the term of this patent is extended or adjusted under 35 U.S.C. 154(b) by 597 days.

(21) Appl. No.: 12/955,600

(22) Filed: Nov. 29, 2010

(65) Prior Publication Data

US 2012/0137287 A1     May 31, 2012

(51) Int. Cl.
| | | |
|---|---|---|
| G06F 15/16 | (2006.01) | |
| G06F 15/173 | (2006.01) | |
| G06F 15/177 | (2006.01) | |
| G06F 9/50 | (2006.01) | |
| H04L 29/08 | (2006.01) | |

(52) U.S. Cl.
CPC ......... *G06F 9/5088* (2013.01); *H04L 29/08144* (2013.01); *H04L 29/08846* (2013.01)
USPC ........... 709/226; 709/203; 709/217; 709/218; 709/219; 709/221; 709/223; 709/224; 709/227

(58) Field of Classification Search
CPC ................... H04L 29/08846; H04L 29/08144; G06F 9/5088
USPC ......... 709/226, 203, 217–219, 221, 223–224, 709/227
See application file for complete search history.

(56) References Cited

U.S. PATENT DOCUMENTS

| | | | | |
|---|---|---|---|---|
| 7,870,153 | B2 * | 1/2011 | Croft et al. | 707/781 |
| 8,396,807 | B1 * | 3/2013 | Yemini et al. | 705/59 |
| 8,583,761 | B2 * | 11/2013 | Park et al. | 709/218 |
| 8,713,564 | B2 * | 4/2014 | Rosu et al. | 718/1 |

(Continued)

OTHER PUBLICATIONS

Beigbeder, et al., "The Effects of Loss and Latency on User Performance in Unreal Tournament 2003", Proceeding of ACM Network and System Support for Games Workshop (NetGames); Portland, OR, USA; Sep. 2004.; 1 page.

(Continued)

*Primary Examiner* — Tauqir Hussain
*Assistant Examiner* — Angela Widhalm
(74) *Attorney, Agent, or Firm* — Cantor Colburn LLP

(57) ABSTRACT

A system is provided for migrating a VM over a WAN. A first server has a VM. The first and second servers are operatively connected over the WAN by a virtual private local area network service. The first server migrates the VM to the second server by coping files and state of the VM to the second server without interrupting the interactive software on the VM. During a last round of migrating the VM, for packets intended for the VM on the first server, the first server buffers the packets in a buffer as buffered packets. Instead of delivering the buffered packets to the VM, the first server transmits the buffered packets to the second server. The second server plays the buffered packets to the VM migrated to and operating on the second server, such that buffered packets are played before current packets currently received from the clients are played.

9 Claims, 6 Drawing Sheets

(56) References Cited

U.S. PATENT DOCUMENTS

Figure 1:
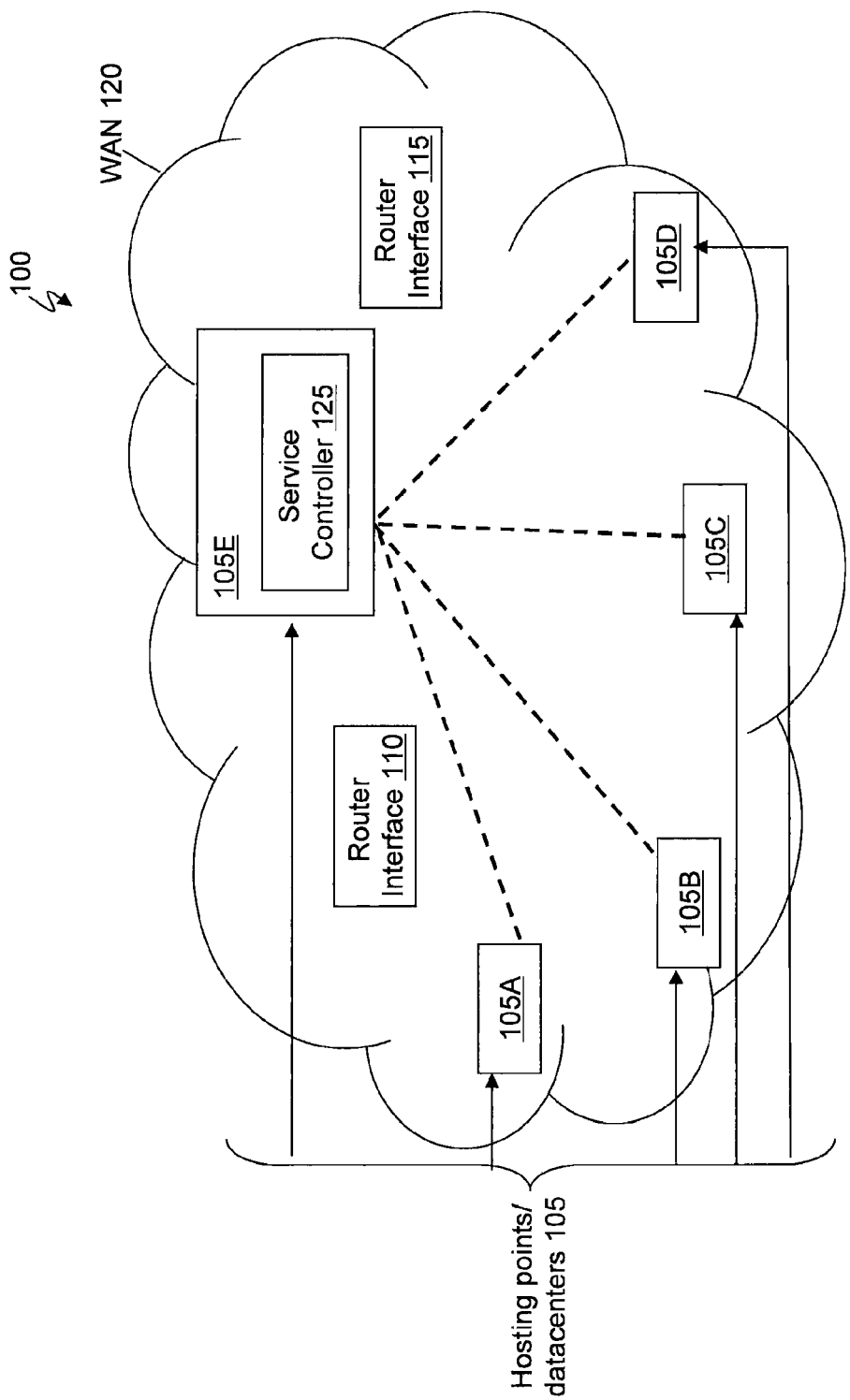

| | | | |
|---|---|---|---|
| 8,762,538 B2* | 6/2014 | Dutta et al. | 709/226 |
| 8,776,041 B2* | 7/2014 | Kachroo et al. | 717/169 |
| 2006/0068912 A1* | 3/2006 | Liu | 463/42 |
| 2008/0201455 A1 | 8/2008 | Husain | |
| 2010/0287548 A1* | 11/2010 | Zhou et al. | 718/1 |
| 2011/0167298 A1* | 7/2011 | Lee | 714/18 |
| 2012/0054367 A1* | 3/2012 | Ramakrishnan et al. | 709/242 |
| 2014/0201365 A1* | 7/2014 | Ashok et al. | 709/225 |

OTHER PUBLICATIONS

Beskow, et al., "Latency Reduction by Dynamic Core Selection and Partial Migration of Game State", Department of Informatics, University of Oslo, Norway; Simula Research Laboratory, Norway; 2008; pp. 1-6.

Bharambe, et al., "Donnybrook: Enabling Large-Scale, High-Speed, Peer-to-Peer Games", Carnegie Mellon University, Pittsburgh, PA, USA; Microsoft Research, Redmond, WA, USA; Copyright 2008; SIGCOMM '08, Seattle, WA, USA; pp. 1-12.

Bharambe, et al., "Colyseus: A Distributed Architecture for Online Multiplayer Games", 2006; Carnegie Mellon University; pp. 1-14.

Bradford, et al., "Live Wide-Area Migration of Virtual Machines Including Local Persistent State", Deutsche Telekom Laboratories, San Diego, CA, USA; Copyright 2007; pp. 1-11.

Caesar, et al., "Design and Implementation of a Routing Control Platform", UC Berkeley, AT&T Labs—Research, MIT, Princeton University; 2005; pp. 1-14.

Chambers, et al., "Measurement-based Characterization of a Collection of On-line Games", Portland State University, IBM Research; 2005; pp. 1-14.

Chen, et al., "ShadowNet: A Platform for Rapid and Safe Network Evolution", c.2010; University of Michigan and AT&T Labs—Research; pp. 1-14.

Das, et al., "OpenFlow: Unifying Packet and Circuit Switched Networks with Openflow", Standford University; Dec. 7, 2009, pp. 1-9.

Sherwood, et al., "OpenFlow: Flow Visor: A Network Virtulization Layer", Deutsche Telekom Inc. R&D Lab, Standard University, Nicira Networks; Oct. 14, 2009; pp. 1-14.

Yap, et al., "OpenFlow: Blueprint for Introducing Innovation into the Wireless Networks we use every day", Stanford University, Deutsche Telekom R&D Lab, and NEC; Oct. 12, 2009, pp. 1-7.

* cited by examiner

OPTIMIZED GAME SERVER RELOCATION ENVIRONMENT

BACKGROUND

Exemplary embodiments relate to computing networks, and more specifically, to dynamic migration of cloud computing services.

"Cloud computing" has recently emerged with enormous success as a new paradigm for distributed computing. In this model, data centers provide dynamically-allocated resources shared by many applications across different domains. This computing model (i.e. cloud computing) offers significant economic advantages of scale for purchasing, operations, and energy usage since the number of idle machines can be reduced by sharing hardware across multiple applications.

Cloud computing is Internet-based computing, whereby shared resources, software, and information are provided to computers and other devices on demand, like the electricity grid. Cloud computing is a paradigm shift following the shift from mainframe to client-server. Details are abstracted from the users, who no longer have need for expertise in, or control over, the technology infrastructure "in the cloud" that supports them. Cloud computing describes a new supplement, consumption, and delivery model for information technology (IT) services based on the Internet, and it typically involves over-the-Internet provision of dynamically scalable and often virtualized resources. Cloud computing is a byproduct and consequence of the ease-of-access to remote computing sites provided by the Internet. This frequently takes the form of web-based tools or applications that users can access and use through a web browser as if it were a program installed locally on their own computer.

Most cloud computing infrastructures consist of services delivered through common centers and built on servers. Clouds often appear as single points of access for all consumers' computing needs. Cloud services also offer a potential advantage for security and management because administration can be performed promptly, and the cost of professional administrators can be amortized over many machines.

BRIEF SUMMARY

According to exemplary embodiments, a system for migrating a virtual machine over a wide area network is provided. A first hosting point has a first server, and the first server includes the virtual machine (VM). A second hosting point has a second server, and the second hosting point is in a different geographical location than the first hosting point. The second hosting point is operatively connected to the first hosting point over the wide area network (WAN), and within the wide area network the first hosting point is operatively connected to the second hosting point by a virtual private local area network service. The virtual machine is configured to run an interactive software of the first server. Clients operatively connect to the Internet protocol (IP) address assigned to the virtual machine on the first server to communicate packets to and from the virtual machine on the first server. In response to instructions, the first server migrates the virtual machine to the second server on the second hosting point by incrementally copying files and state of the virtual machine to the second server without interrupting the interactive software running on the virtual machine. During a last round of migrating the virtual machine to the second server when the virtual machine temporarily stops operating, for packets intended for the virtual machine on the first server, the first server buffers the packets in a buffer as buffered packets instead of discarding the packets, and the first server transmits the buffered packets to the second server at the second hosting point. The second server sends the buffered packets to the virtual machine now migrated to and operating on the second server at the second hosting point, such that the buffered packets are played before current packets currently received from the clients are played.

Additional features are realized through the techniques of the present disclosure. Other systems, methods, apparatus, and/or computer program products according to other embodiments are described in detail herein and are considered a part of the claimed invention. For a better understanding of exemplary embodiments and features, refer to the description and to the drawings.

DETAILED DESCRIPTION OF EXEMPLARY EMBODIMENTS

The subject matter which is regarded as the invention is particularly pointed out and distinctly claimed in the claims at the conclusion of the specification. The foregoing and other features of the present disclosure are apparent from the following detailed description taken in conjunction with the accompanying drawings in which:

FIG. 1 illustrates a block diagram of a system architecture in accordance with exemplary embodiments.

FIGS. 2, 3, 4, and 5 illustrate migration of a virtual machine from one location to another location in accordance with exemplary embodiments.

Figure 6:
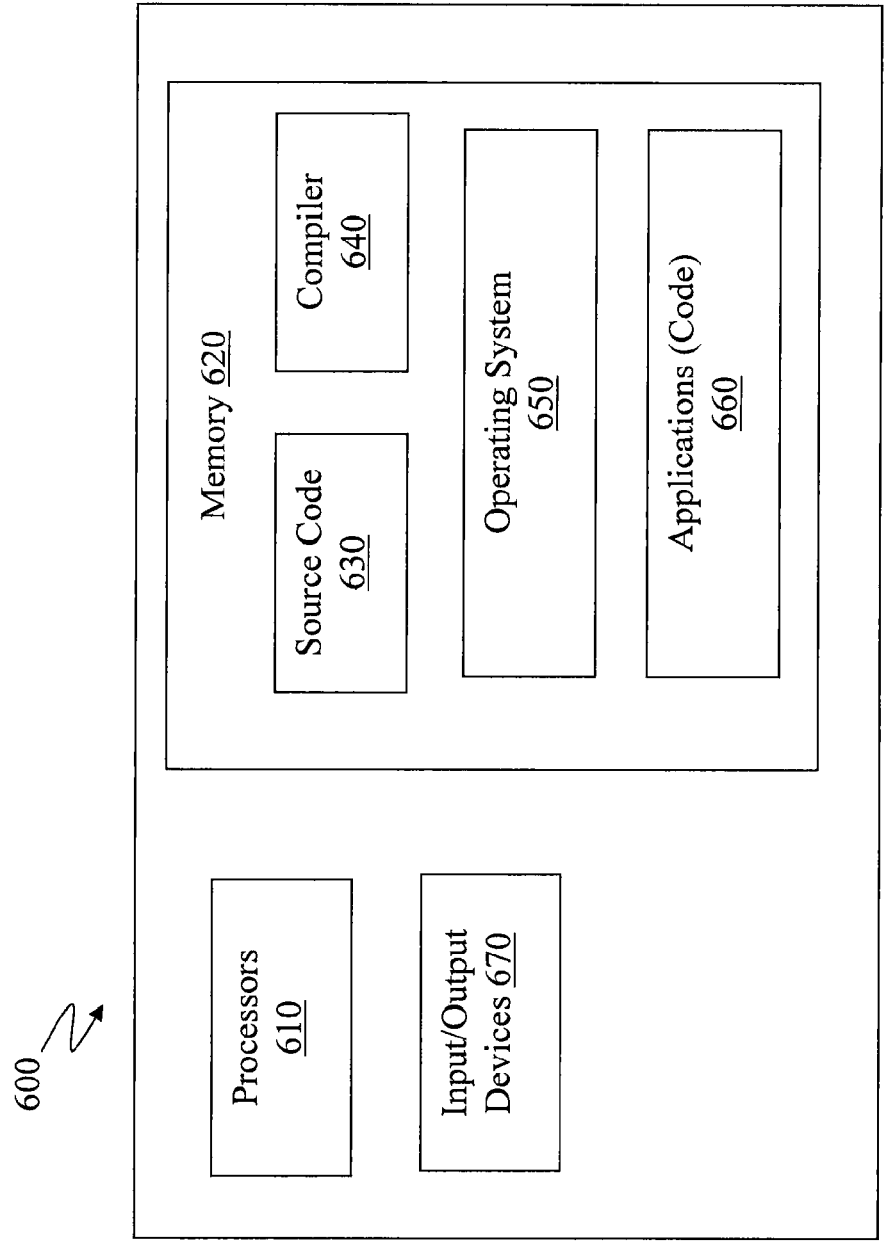

FIG. 6 illustrates an example of a computer having capabilities, which may be included in exemplary embodiments.

DETAILED DESCRIPTION OF EXEMPLARY EMBODIMENTS

There is a particular class of applications that are more difficult to support in cloud environments which are highly interactive network applications, such as online games. These interactive applications face several unique challenges. Online games have stringent quality of service (QoS) demands where even small increases in latency can interfere with gameplay, and hence come with strong requirements on where servers can be placed geographically. At the same time, the unpredictability of network QoS coupled with the difficulty in predicting where, i.e., geographic location of a game server, a game will become popular make it hard to statically place these services. Even further, unlike web users, game players often have strong affinity to a particular server, e.g., game servers containing their friends, which is a particular server that friends log onto at a particular geographic location. This can make it difficult to use traditional load balancing and dynamic service provisioning mechanisms to service new clients. While application specific schemes have been proposed for network games to deal with some of these issues, e.g., by partitioning state or relaxing consistency models, these schemes require substantial changes in the way game developers architect/create their games.

These challenges are ill-timed, as the online gaming market is a rapidly growing multi-billion dollar industry with hundreds of millions of players. Similar challenges prevent other interactive applications from reaping the full benefits of cloud computing, such as collaborative document editing and digital whiteboards.

In developing exemplary embodiments, we explored and developed how dynamic migration of cloud computing services can simplify issues related to highly interactive network applications, such as online games. We propose an Optimized Game Server Relocation Environment (OGRE), which dynamically optimizes geographic server placement and transparently exploits application specific properties, of e.g., online games, to minimize observable effects of live server migration. Exemplary embodiments take the relatively unexplored approach of integrating cloud services with the network. Along these lines, exemplary embodiments break out into three areas for ease of understanding but not limitation.

First, to reduce outages during migration of gaming servers, we develop a network based "accelerator" for virtual machine migration according to exemplary embodiments. Exemplary embodiments provide an example implementation to realize this substrate with traditional protocols such as Virtual private LAN service (VPLS) in Internet service provider (ISP) networks. Virtual private LAN service (VPLS) is a way to provide Ethernet based multipoint to multipoint communication over Internet protocol (IP)/Multiprotocol Label Switching (MPLS) networks. VPLS allows geographically dispersed sites to share an Ethernet broadcast domain by connecting sites through pseudo-wires. VPLS is a virtual private network (VPN) technology. In a VPLS, the local area network (LAN) at each site is extended to the edge of the provider network. The provider network then emulates a switch or bridge to connect all of the customer LANs to create a single bridged LAN. As shown in FIGS. 2-5 below, the LAN of hosting points 105A and 105B is extended to provide edge routers 1 and 2 of the provider network, and the hosting points 105A and 105B are connected by a VPLS 225.

Second, to strategically place servers in the face of changing network characteristics and service workloads, exemplary embodiments provide a dynamic placement scheme to automatically trigger and re-locate gaming servers in the wide area.

Third, to ensure high quality paths and to take into account discovered network characteristics, e.g., of online gamers, exemplary embodiments provide a framework for integration of route control and server placement. By performing judicious modifications of route advertisements, OGRE can migrate a VM in the wide area in a manner transparent to game servers and players.

In developing exemplary embodiments, we conducted a measurement study of online games to characterize migration according to exemplary embodiments. In alignment with the online game measurement study, exemplary embodiments provide for and we discovered that (1) games should have dynamic, not static allocation of resources such as game server resources, (2) games should have migration, not replication of resources, and (3) games should have seamless, not paused migration.

Now turning to FIG. 1, FIG. 1 illustrates a block diagram of a system architecture 100 in accordance with exemplary embodiments.

The architecture 100 includes various components. The service operator deploys a set of hosting points 105 in the wide area network (WAN) 120. These hosting points 105 such as 105A, 105B, 105C, and 105D act as facilities such as datacenters where processes may be run. Each hosting points 105 may include multiple servers, storage systems, and connections for operating as a datacenter. Hosting points 105 may also include redundant or backup power supplies, redundant data communications connections, environmental controls including, e.g., air conditioning and fire suppression, and security devices. For example, an Internet service provider (ISP) network service operator may integrate cloud computing functionality into its backbone by deploying hosting points 105 in its points of presence. Internally, the hosting point 105 may be realized as one or more servers running virtualization software to support migration of the interactive processes. In one implementation of exemplary embodiments, each process such as an online game runs within its own virtual machine (VM), with migration performed by the hypervisor of the hosting point 105 which is discussed further herein.

Next, to support the migration, the network exposes router interfaces 110, 115 to monitor and manipulate network state. Router interfaces 110, 115 may also be known as tees. Router interfaces 110, 115 may be used to manipulate routes, redirect traffic, and observe traffic patterns and routing tables within the network 120, to support migration of processes, e.g., to redirect traffic to the process's new location such as from host point 105A in New York to hosting point 105B in San Francisco. Exemplary embodiments may utilize existing router interfaces 110, 115 already in service. For example, router interfaces 110, 115 may be implemented through routing protocol sessions and/or vty scripts to manipulate state of the server having the VM, and through Netflow analyzer, Syslog and/or simple network management protocol (SNMP) for monitoring. The process running within the VM can be interactive online gaming software.

To coordinate migration of the VM in one hosting point 105 to another hosting point 105, e.g., from current hosting point 105A to future hosting point 105B, the service operator runs a service controller 125. The service controller 125 is a software application in memory running on a processor of a computer system such as a server. The migration coordination may also be performed by the hypervisor of the current hosting point 105 and/or by the hypervisor of the future hosting point 105, and the migration coordination may be shared between the hypervisors of the current hosting point 105 and the future hosting point 105. A hypervisor is also called virtual machine monitor (VMM), and the hypervisor allows multiple operating systems to run concurrently on a host computer or server in the hosting point 105, which is called hardware virtualization. The hypervisor presents the guest operating systems a virtual operating platform and monitors the execution of the guest operating systems on the virtualized hardware resources of, e.g., a server in the hosting point 105. The guest operating system may be the interactive online game software.

The service controller 125 and/or hypervisor monitors performance of processes running at hosting points 105, including the processes of the VM of the online game. The service controller 125 and/or hypervisor then uses this information to make decisions regarding when VM processes should be migrated, and which new hosting points 105 that the VM processes should be migrated to. VM processes, the processes of VM, and VM may be used interchangeably. The service controller 125 and/or hypervisor is configured to migrate the VM from one hosting point 105 to another hosting point 105 when a predefined number of gamers (referred to as game clients in FIGS. 2-5) have logged onto the game server, when a predefined number of gamers are attempting to log onto the game server, and/or when a predefined number of gamers are playing on the game server of the current hosting point 105. Also, the service controller 125 is configured to migrate the VM based on a time of day such as the morning, midday, evening, and/or night. For example, since measurements of exemplary embodiments determine that online gamers have peaks in the evening and night and that online gamers prefer certain game servers, the service controller 125 may be configured to migrate the VM of the game server nearing and/or at peak times, such as in the evening, e.g., 5:00 PM and/or at night, e.g., 8:00 PM. Also, the service controller 125 and/or hypervisor may be configured to migrate the VM based on the particular day of the week such as weekend, week day, holiday, and/or special occasion. For example, online gamers may play all day on weekends and holidays, so the service controller 125 and/or hypervisor is configured to migrate the VM from a popular game server at hosting point 105A to a different game server at hosting point 105B because the different game server has more resources such as processor speed, random access memory, hard drive, faster busses, etc., and/or because the different game server has less communication traffic. Also, the service controller 125 and/or hypervisor may be configured to migrate the VM of the game server to a different game server when the service controller 125 and/or hypervisor determines that for the instant game operating on the VM the number of gamers causes the instant game to run slowly, to reach a predefined delay in user response on the game that is recognizable by the user, and/or to potentially reach the predefined delay in user response that is recognizable by the user if gamers continue logging into the game server. As mentioned above, the hypervisor of VM for the current game server and/or the hypervisor of the game server for the future location for the VM can function and operate as the service controller 125 for determining when to migrate the VM from one hosting point 105 to another hosting point 105.

To begin the VM migration from one hosting point 105 to a different hosting point 105 at a different geographical location, the service controller 125 instructs the hypervisor (i.e., virtualization software running) at the hosting points 105 when and where the process should be migrated to. To coordinate this change with the network 120, the service controller 125 also sends instructions to router interfaces 110, 115 (i.e., network tees), to indicate any changes to routing state. Routing state is the forwarding information for routing packets over the network 120. Also, in exemplary embodiments, the hypervisor may determine that VM migration should occur.

Now, with reference to FIGS. 2, 3, 4, and 5, FIGS. 2-5 are meant to incorporate all the elements of FIG. 1 although some elements of FIG. 1 are not shown for conciseness. FIGS. 2-5 illustrate the migration of the VM 110a which comprises, e.g., interactive online game software as the process for an online game from one game server 230A in hosting point 105A to another game server 230B in hosting point 105B according to exemplary embodiments. For example, the current hosting point 105A is in New York while the future hosting point 105B is in San Francisco.

To migrate virtual machines VM 110a over long distances and with minimal service disruption, one may attempt to use conventional virtual machine migration techniques. Conventional migration cannot be directly used in wide area networks (WAN) to migrate a VM of an interactive online game in which multiple game clients 215, which are users of the VM interactive online game that have established IP socket connections to the VM.

Exemplary embodiments are configured to reduce packet loss while performing the VM 110a migration of the interactive online game of the VM 110a while multiple game clients 215, i.e., gamers, are actively playing the interactive game of the VM 110a. Without the game clients 215 experiencing a pause and/or delay in their online gaming experience of the VM 110a, the service controller 125 and/or hypervisors 240A and 240B seamlessly migrates the VM 110a and continues the interactive online game of the VM 110a.

Figure 2:
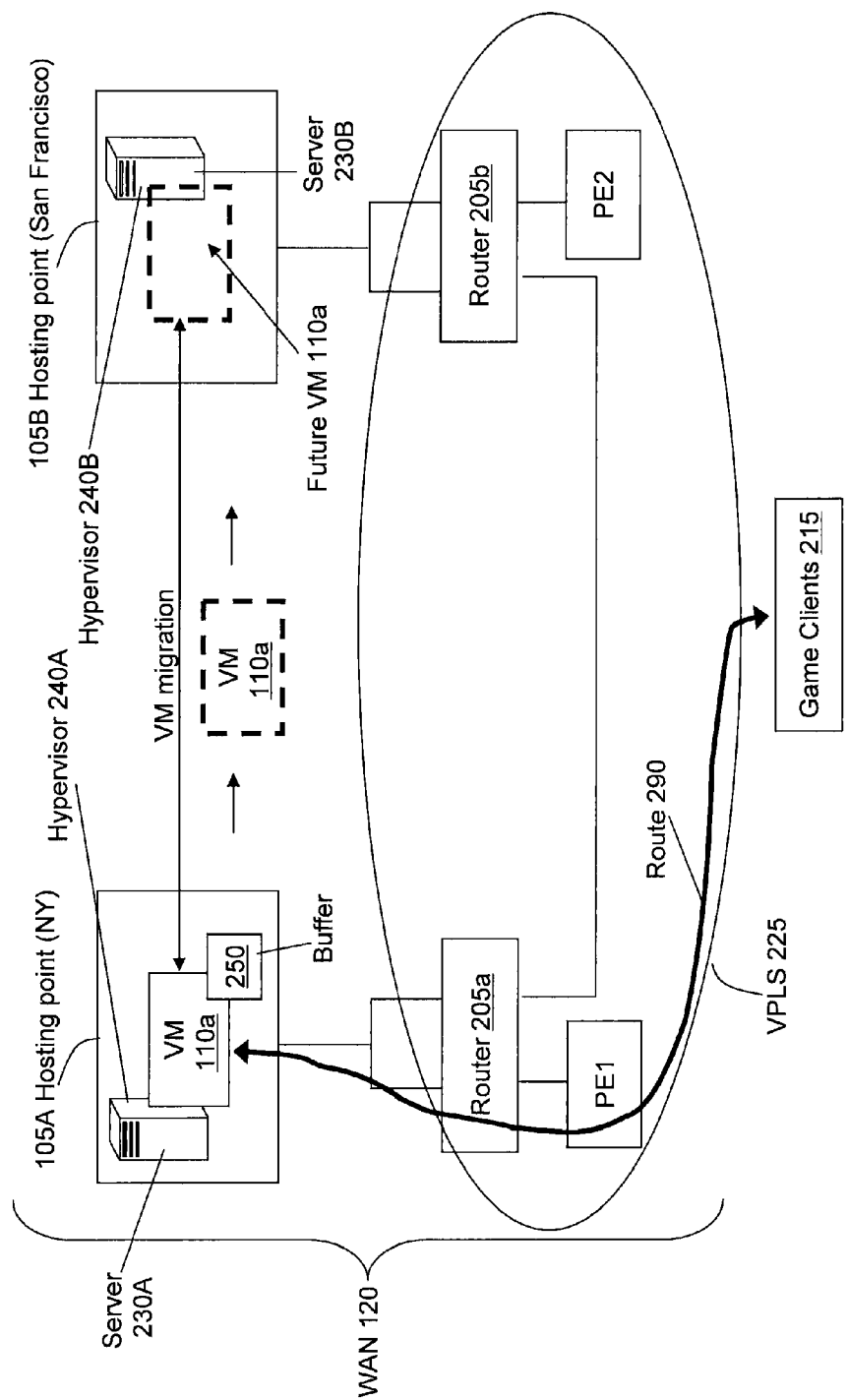
Figure 3:
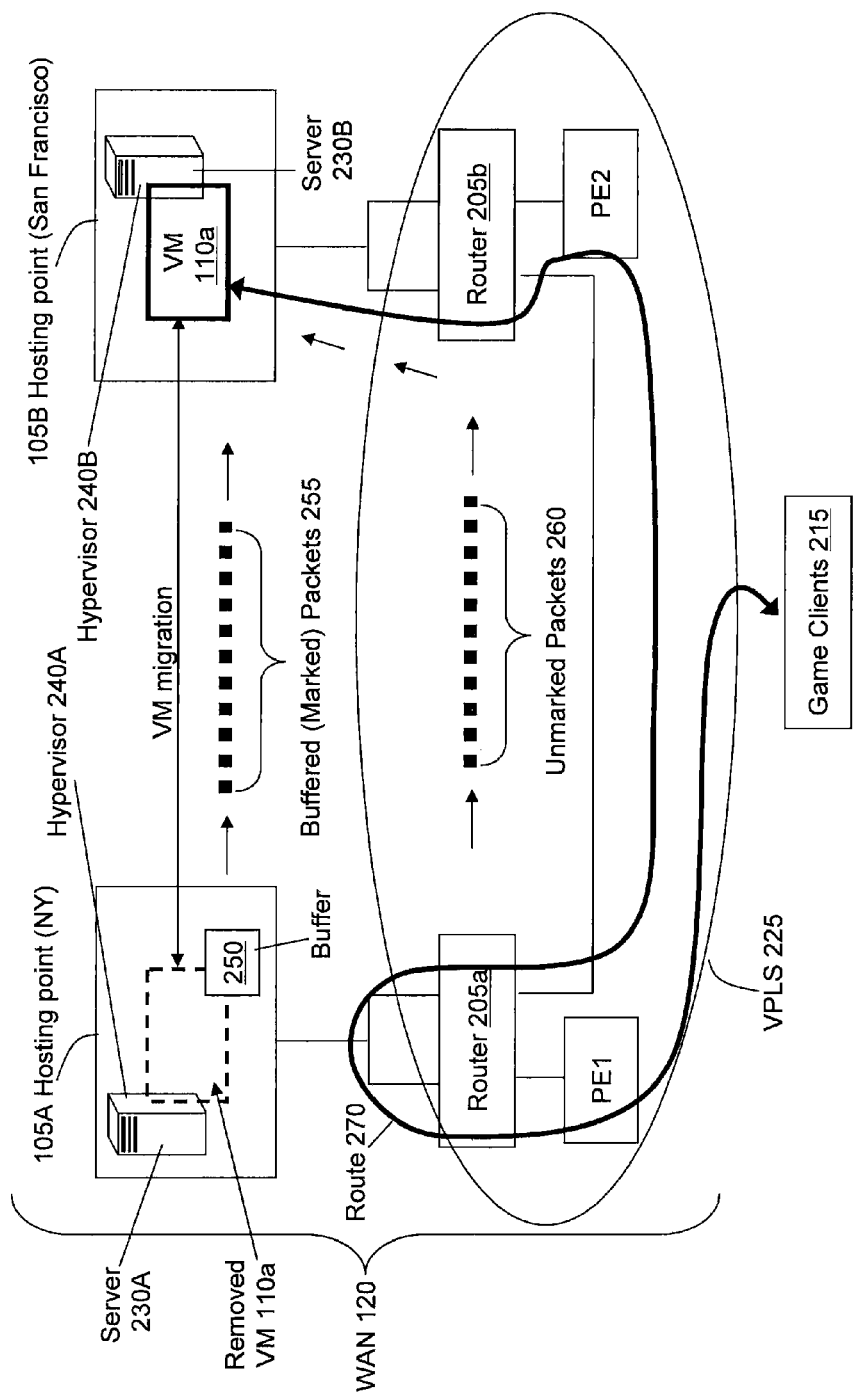

In this example, consider the migration of process P from the hypervisor 240A running at the server 230A to the hypervisor 240B running at server 230B, where the process is the interactive online game. With reference to FIG. 2, during migration which occurs while the game clients 215 are playing the online game of the VM 110a, the hypervisor 240A copies the files and state of the virtual machine VM 110a in multiple rounds to the hypervisor 240B. With reference to FIG. 3, during the last round of migration, hypervisor 240A begins to buffer all packets in buffer 250 from the game clients 215, instead of delivering them to VM 110a of the server 230A for processing, thus for this brief instance the VM 110a is not processing incoming packets of game clients 215. After VM 110a finishes migrating to hypervisor 240B, the hypervisor 240B establishes processing of the VM 110a now residing in game server 230B in San Francisco. At the end of the last round of migration of copying files and state of the VM 110a from server 230A to server 230B, the processing of VM 110a on server 230B is simultaneously and/or near simultaneously started.

To mask the appearance of any outage that would normally be caused in conventional systems when processing of the VM 110a is paused in the hypervisor 240A of the server 230A, the hypervisor 240A begins simultaneously sending the buffered packets 255 in its buffer 250 to the hypervisor 240B, which then plays the buffered packets 255 back to process P running in VM 110a of the sever 230B. For example, at the point when the VM 110a at the server 230A is no longer processing, the hypervisor 240A sends the buffered packets 255 to the server 230B for processing by the VM 110a. Each of the buffered packets 255 are marked by the hypervisor 240A as marked to be identified as marked buffered packets 255 by the hypervisor 240B.

To provide a seamless migration of the VM 110a to the server 230B for the game clients 215 without interruption and without requiring the game clients 215 to connect to a different IP address, the hypervisor 240A also switches incoming network traffic from the game clients 215 to the VM's 110a new location at the hypervisor 240B of the server 230B. As such, the unmarked packets 260 intended for the server 230A are re-routed on route 270 by router 205a and/or PE1 as instructed, e.g., by the server 230A.

To mask and/or prevent any loss during this switchover of unmarked packets 260 from being received at the server 230A in hosting point 105A to now being received at VM 110a in the server 230B in hosting point 105B, the buffered packets 255 from the last round of migration in the hypervisor 240A's buffer 250 are marked; the hypervisor 240B plays back marked buffered packets 255 to VM 110a in server 230B before any unmarked packets 260 received directly from the network 120 are played.

Figure 4:
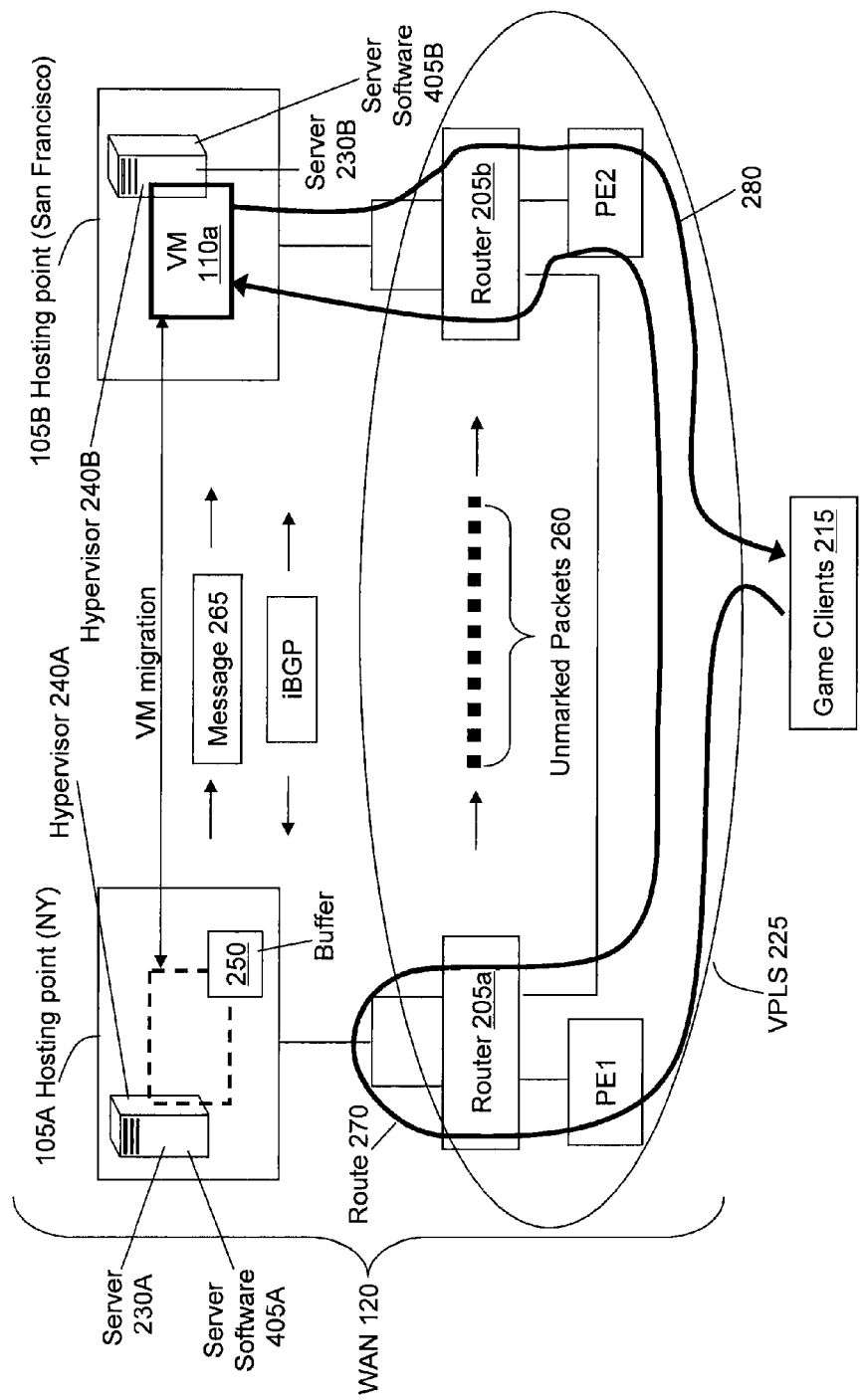

To cause hypervisor 240B to switch over to processing packets 260 directly received from the network instead of processing the marked packets 255, hypervisor 240A sends a special end-of-buffer message 265 when its buffer 250 is empty as shown in FIG. 4. As seen in FIG. 4, the hypervisor 240A of the server 230A instructs the router 205a to route/redirect the packets 260 to the router 205b to send to the server 230B for processing by VM 110a in the hosting point 205B.

According to exemplary embodiments, shifting traffic with seamless route control is further discussed below. In addition, to migrating the process of the VM 110a, exemplary embodiments provide a way for incoming traffic to reach the VM 110a process's new location at the hosting point 105B. One approach would be to migrate the VM process to a new server, which has a new IP address. The issue with this approach is that this would break existing client connections of the game clients. To address this, some virtualization techniques have been developed for local area networks (LAN) to fail-over traffic from one server to another, in a manner that appears seamless to external clients. However, these techniques target migration within a single Ethernet-based IP subnet, as opposed to wide area networks that span large geographic regions, multiple routing protocols, and multiple IP subnets.

Figure 5:
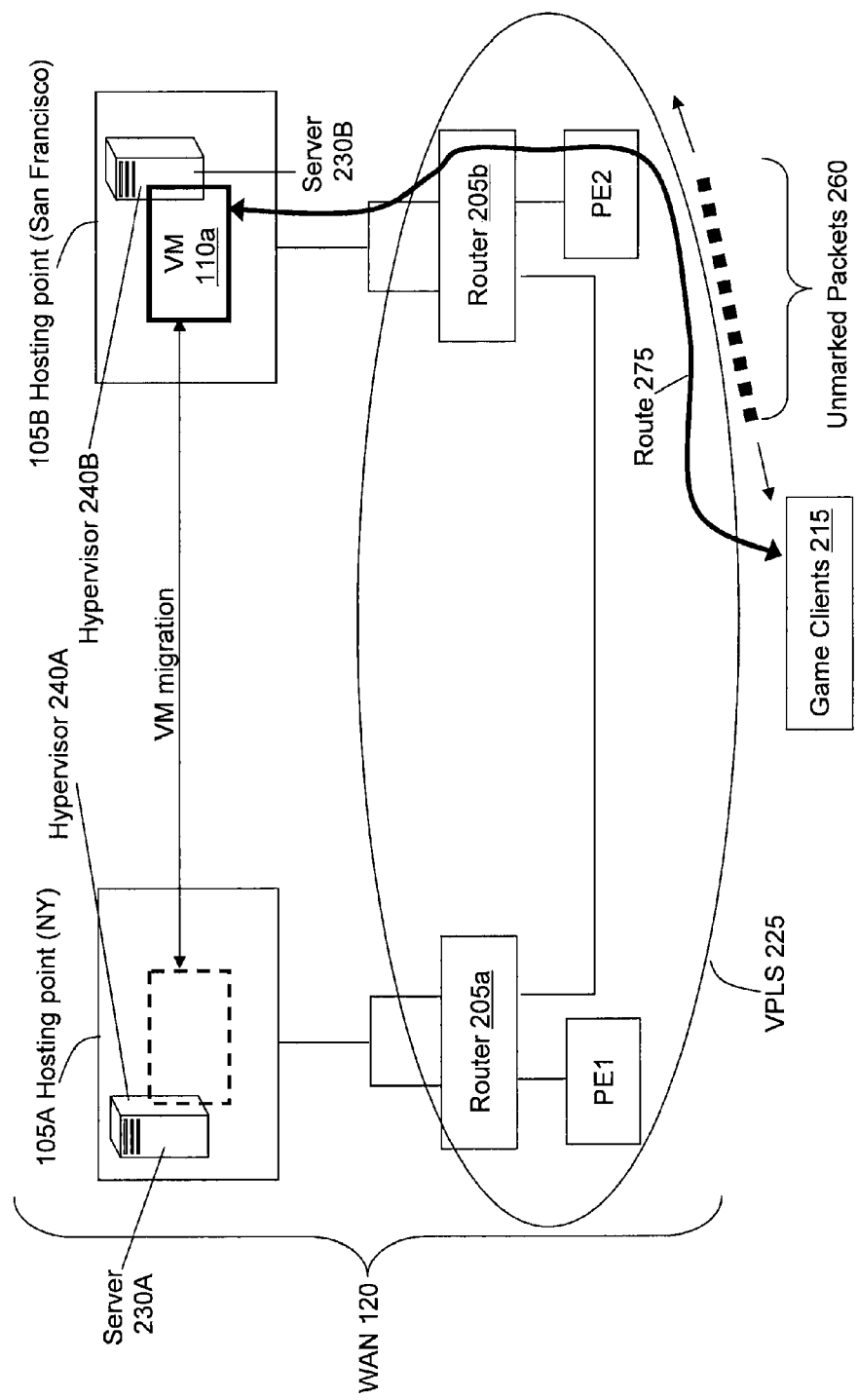

Exemplary embodiments are configured to address this issue related to wide area networks 120 that span large geographical regions such as the Internet and other issues by coordinating VM 110a migration with network route control. Here, each VM process including VM 110a and other VMs on the servers 230A and 230B in the network is allocated a small IP subnet. Internal border gateway protocol (iBGP) sessions are run between physical locations such as the New York hosting point 105A and the San Francisco hosting point 105B where the servers 230A and 230B are hosted to routers 205a and 205b within the network. Respective server software 405A and 405B runs the iBGP session on the servers 230A and 230B. Upon migration of the VM 110a process to the new hosting point 105B, the new hosting point 105B, e.g., the hypervisor 205B, is instructed to begin advertising the VM 110a process's IP subnet at the new hosting point 105B. In particular, when the VM 110a process is migrated from hosting point 205A to hosting point 205B, three steps may be performed. First, the iBGP session via server software 405B at server 230B starts to announce a more specific prefix to reach the VM 110a process now migrated onto the server 230B. By iBGP session advertising the more specific prefix, the new route 275 in FIG. 5 will be more preferred than the old route 270 in FIG. 4, causing all traffic 260 to shift away from the old route 270. Second, after a suitable delay to let the network converge, the iBGP session by server software 405A at server 230A withdraws the less-specific prefix which corresponds to the route 270. Further, to enable the VM 110a on the server 230B to be migrated again later on, the iBGP session at server 230B may begin advertising the less-specific prefix after a suitable delay (by the server software 405B). When this advertising process by the iBGP is complete, the original IP prefix has been migrated over the wide area network 120 to the new location at hosting point 105B, so traffic 260 within the network is sent to the new VM 110a location at the server 230B via the route 275 as shown in FIG. 5.

In a conventional system, there may be a challenge that this network control using iBGP can result in an outage while iBGP is converging. To address this, exemplary embodiments use VPLS 225 to create a virtual LAN that spans the hosting points 105A and 105B over the wide area network 120. This ensures the correct delivery of packets 260 arriving at the previous hosting point 105A during the convergence time so that the router 205a can re-route packets 260 from game clients 215 to the VM 110a in hosting point 105B without interruption to the online interactive game, although the route 270 used re-routing might not be optimal for the transient period. Upon the completion of VM 110a migration, the new hosting point 105B can immediately announce the new location of the IP address assigned to the VM 110a, e.g., using unsolicited ARP reply. Moreover, performing route control with these techniques of exemplary embodiments ensures that every game client 215 is always able to reach the VM 110a in the server 230B of the new hosting point 105B without interruption to the online game being played and without delay. Also, as long as the different physical locations are within a single Autonomous System (AS), no inter-AS advertisements are caused by the route control of the exemplary embodiments.

Further, each of the game clients 215, which represent a plurality of individual gamers using processor based computing devices having gaming capabilities and network connection capabilities, is able to maintain its IP connection via the same IP address that the game clients 215 originally connected with server 230A in hosting point 205A. Exemplary embodiments utilize VPLS 225 to connect distinct hosting points 105 across states, i.e., different geographical locations, by using subnetting.

For example, the hosting points 105A and 105B may have the same IP address, in that an IP (Internet Protocol) address is a unique identifier for a node or host connection on an IP network, and every IP address consists of two parts, one identifying the host network and one identifying the node. The node part may be referred to as the subnet "/__ __" part of the IP address. Within the same IP address, hosting points 105A and 105B are identified by the same host network address part. For example, hosting points 105A and 105B may have the same IP address host network part 99.1.73.7. To specifically reach the server 230A in the hosting point 105A the IP address including subnet is 99.1.73.7/29, and to reach the server 230B in the hosting point 105B the IP address including subnet is 99.1.73.7/32. In exemplary embodiments, VM 110a has IP address 99.1.73.7 for this example. Before migration, traffic to and from VM 110a goes through provider edge 1 (PE1) to VM 110a in the hosting point 105A. After the VM 110a is migrated to hosting point 105B, traffic can still reach the VM 110a in hosting point 105B because of layer 2 VPLS via re-routing by router 205a on route 270. In FIG. 4, the hypervisor 240A and/or hypervisor 240B changes the default gateway on the VM 110a to reach the Internet WAN 120 via route 280, such that the VM 110a transmits its packets to the individual game clients 215 through router 205b and PE2 via the route 280. As such, traffic from the VM 110a in server 230B is routed correctly. However, in FIG. 4, traffic to the VM 110a from game clients 215 is still on route 270, which may not be optimal. The server software 405B via an iBGP session advertises IP address 99.1.73.7/32 for the VM 110a on server 230B as the more specific route 275 preferred over 99.1.73.7/29 for hosting point 205A. Nevertheless, at this point both paths 270 and 275 are valid via PE1 and PE2 as shown in FIGS. 4 and 5 without interruption to the playing of the interactive online game software by the VM 110a, and the game clients 215 can benefit from having more resource on the server 230B.

Moreover, the rerouting of packets from the first server 230A to the second server 230B is accomplished as follows: The router 205B in front of the second server 205B advertises a more specific IP prefix via BGP than the router 205A in front of the first server 205A and this prefix encompasses the virtual machine's IP address. After a short delay, the router 205A in front of the first server withdraws its less specific prefix via BGP. Finally, the router 205B in front of the second server 230B advertises the same less specific prefix via BGP as the first router 205A did and withdraws the more specific prefix. After this process, migration can occur in the reverse direction with the roles of the two servers reversed. The BGP routing instructions for router 205A may be from server software 405A, and BGP routing instructions for router 205B may be from server software 405B. After this process, migration can occur in the reverse direction with the roles of the two servers reversed.

The hypervisors 240A and 240B and/or the service controller 125 are configured to have application aware migration software. As discussed herein, the VM 110a may be running an interactive software game in which game clients 215 are operatively connected to and playing on the server 230A. The following example uses hypervisor 240A but applies to hypervisors 240B and the service controller 125. The hypervisor 240A may monitor the connections by game clients 215 to the VM 110a on the server 230A, and when the number of connections by game clients 215 reaches a predefined number that is related to the resources allocated for the VM 110a on the server 230A, the hypervisor 240A then monitors the particular game being played on the VM 110a to determine the round/stage of the game. For example, the hypervisor 240A can determine and/or receive an indication of nearing the end of the round and/or the end of the round. When the round ends, the hypervisor 240A can start VM 110a migration to the hosting point 205B by sending files and state as discussed herein. Accordingly, VM migration can occur at the end of a game round/stage as determined by the hypervisor 240A. In certain games running on the VM 110a, after every level, players return to their initial positions, and the game map and statistics are reset; during this time player movements are static so performing migration at this time may be helpful to make any transient packet loss less directly perceptible to players, i.e., individual game clients 215. That is, the hypervisor 240A can be designed to be game software application aware such that the hypervisor 240A can identify such periods above during which the game server, i.e., VM 110a, can be relocated. Note that VM 110a may be considered a virtualized server and game server.

Exemplary embodiments are backwards compatible to existing/legacy servers, routers, access points, and switches. For example, exemplary embodiments do not require existing/legacy switches, routers, access points to implement new specialized software and/or hardware components for VM migration discussed herein. For example, the routers 205a, 205b, PE1, and PE2 are not required to have a special software running on them such that original route 290 in FIG. 1 can be changed to route 270 and/or 275. Additionally, exemplary embodiments do not require a special controller to cause the routes to be changes from route 290 to routes 270 and/or 275 during VM migration. For example, exemplary embodiments do not require specialized FlowVisor™ and/or OpenFlow™ software to be implemented in routers 205a, 205b, PE1, PE2, service controller 125, and switches (not shown) to cause seamless migration of VM 110a from servers 230A to 230B. Further, exemplary embodiments do not require specialized routing-type software to sit between underlying physical hardware and software that controls a router, switch, and/or computer to control the flow of traffic entering and existing the same.

Also, exemplary embodiments provide primitives for live VM (server) migration and do not cause outages and/or downtimes to the game clients 215 when migrating the VM 110a over the WAN 120. When transferring the files of the VM 110a, the hypervisor 240A also transfers the primitives to the hypervisor 240B during migration. Also, implementations of exemplary embodiments do not require modification of the particular game software running on the VM 110a for live VM modification to occur over the WAN 120.

FIG. 6 illustrates an example of a computer 600 having capabilities, which may be included in exemplary embodiments. Various methods, procedures, modules, flow diagrams, tools, application, architectures, and techniques discussed herein may also incorporate and/or utilize the capabilities of the computer 600. Moreover, capabilities of the computer 600 may be utilized to implement features of exemplary embodiments discussed herein. One or more of the capabilities of the computer 600 may implement any element discussed herein such as in FIGS. 1-5.

Generally, in terms of hardware architecture, the computer 600 may include one or more processors 610, computer readable storage memory 620, and one or more input and/or output (I/O) devices 670 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 610 is a hardware device for executing software that can be stored in the memory 620. The processor 610 can be virtually any custom made or commercially available processor, a central processing unit (CPU), a data signal processor (DSP), or an auxiliary processor among several processors associated with the computer 600, and the processor 610 may be a semiconductor based microprocessor (in the form of a microchip) or a macroprocessor.

The computer readable memory 620 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 620 may incorporate electronic, magnetic, optical, and/or other types of storage media. Note that the memory 620 can have a distributed architecture, where various components are situated remote from one another, but can be accessed by the processor 610.

The software in the computer readable memory 620 may include one or more separate programs, each of which comprises an ordered listing of executable instructions for implementing logical functions. The software in the memory 620 includes a suitable operating system (O/S) 650, compiler 640, source code 630, and one or more applications 660 of the exemplary embodiments. As illustrated, the application 660 comprises numerous functional components for implementing the features, processes, methods, functions, and operations of the exemplary embodiments. The application 660 of the computer 600 may represent numerous applications, agents, software components, modules, interfaces, controllers, etc., as discussed herein but the application 660 is not meant to be a limitation.

The operating system 650 may control the execution of other computer programs, and provides scheduling, input-output control, file and data management, memory management, and communication control and related services.

The application(s) 660 may employ a service-oriented architecture, which may be a collection of services that communicate with each. Also, the service-oriented architecture allows two or more services to coordinate and/or perform activities (e.g., on behalf of one another). Each interaction between services can be self-contained and loosely coupled, so that each interaction is independent of any other interaction.

Further, the application 660 may be a source program, executable program (object code), script, or any other entity comprising a set of instructions to be performed. When a source program, then the program is usually translated via a compiler (such as the compiler 640), assembler, interpreter, or the like, which may or may not be included within the memory 620, so as to operate properly in connection with the O/S 650. Furthermore, the application 660 can be written as (a) an object oriented programming language, which has classes of data and methods, or (b) a procedure programming language, which has routines, subroutines, and/or functions.

The I/O devices 670 may include input devices (or peripherals) such as, for example but not limited to, a mouse, keyboard, scanner, microphone, camera, etc. Furthermore, the I/O devices 670 may also include output devices (or peripherals), for example but not limited to, a printer, display, etc. Finally, the I/O devices 670 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 670 also include components for communicating over various networks, such as the Internet or an intranet. The I/O devices 670 may be connected to and/or communicate with the processor 105 utilizing Bluetooth connections and cables (via, e.g., Universal Serial Bus (USB) ports, serial ports, parallel ports, FireWire, HDMI (High-Definition Multimedia Interface), etc.).

When the computer 600 is in operation, the processor 610 is configured to execute software stored within the memory 620, to communicate data to and from the memory 620, and to generally control operations of the computer 600 pursuant to the software. The application 660 and the O/S 650 are read, in whole or in part, by the processor 610, perhaps buffered within the processor 610, and then executed.

When the application 660 is implemented in software it should be noted that the application 660 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 660 can be embodied in any computer-readable medium 620 for use by or in connection with an instruction execution system, apparatus, server, or device, such as a computer-based system, processor-containing system, or other system that can fetch the instructions from the instruction execution system, apparatus, or device and execute the instructions. In the context of this document, a "computer-readable storage medium" can be any means that can store, read, write, communicate, or transport the program for use by or in connection with the instruction execution system, apparatus, or device. The computer readable medium can be, for example but not limited to, an electronic, magnetic, optical, or semiconductor system, apparatus, or device.

More specific examples (a nonexhaustive list) of the computer-readable medium 620 would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 660 is implemented in hardware, the application 660 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is understood that the computer 600 includes non-limiting examples of software and hardware components that may be included in various devices, servers, routers, switches, and systems discussed herein, and it is understood that additional software and hardware components may be included in the various devices and systems discussed in exemplary embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the exemplary embodiments of the invention have been described, it will be understood that those skilled in the art, both now and in the future, may make various improvements and enhancements which fall within the scope of the claims which follow. These claims should be construed to maintain the proper protection for the invention first described.

What is claimed is:

1. A system for migrating a virtual machine over a wide area network, comprising:
    a first server at a first hosting point, the first server comprising the virtual machine;
    a second server at a second hosting point, the second hosting point being in a different geographical location than the first hosting point, the first server and the second server comprising hardware processors, wherein the second hosting point is operatively connected to the first hosting point over the wide area network;
    wherein within the wide area network the first hosting point is operatively connected to the second hosting point by a virtual private local area network service;
    wherein the virtual machine runs an interactive online gaming software on the first server;
    wherein the virtual machine on the first server communicates packets to and from clients operatively connected to the virtual machine on the first server via an internet protocol address assigned to the virtual machine;
    wherein in response to instructions, the first server migrates the virtual machine to the second server on the second hosting point by incrementally coping files and state of the virtual machine to the second server without interrupting the interactive software running on the virtual machine;
    wherein the first server comprises application aware software that detects an end of a game stage in the interactive online gamming software running on the virtual machine when online players in a game return to initial positions after a level;
    wherein the first server starts migration of the virtual machine for the interactive online gamming software running on the virtual machine in response detecting the end of the game stage when players in the game return to initial positions after the level;
    wherein during a last round of migrating the virtual machine to the second server when the virtual machine temporarily stops operating, for packets intended for the virtual machine on the first server, the first server buffers the packets in a buffer as buffered packets, and instead of discarding the packets, the first server transmits the buffered packets to the second server at the second hosting point;
    wherein the second server sends the buffered packets to the virtual machine now migrated to and operating on the second server at the second hosting point, such that the buffered packets are played before current packets currently received from the clients are played;
    wherein the second server causes a second router, in front of the second server, to advertise a more specific internet protocol prefix via a border gateway protocol than a first router in front of the first server, the more specific internet protocol prefix encompasses the internet protocol address assigned to the virtual machine;
    wherein in response, the first server causes the first router in front of the first server to withdraw a less specific internet protocol prefix of the first router via the border gateway protocol;
    wherein the second server receives and distinguishes current packets received by the second server from the buffered packets received by the second server, in which the current packets are received from the clients and the buffered packets are received from the first server;
    wherein in response to the last round of migrating the virtual machine to the second server, the first server marks the buffered packets which were originally intended for the virtual machine on the first server, such that the second server can identify a mark of the buffered packets when the second server receives the buffered packets; and
    wherein at an end of the buffered packets being transmitted to the second server, the first server sends an end of buffered packets message to the second server, such that the second server knows to start playing the current packets to the virtual machine on the second server upon receipt of the end of buffered packets message in place of playing the buffered packets having the mark.

2. The system of claim 1, wherein in response to the virtual machine being migrated to the second server, the current packets intended for the first server and received at the first router of the first hosting point are re-routed to the second router at the second hosting point for transmission to the second server; and
  wherein the current packets are re-routed over a first path which is from the clients to the first router of the first point and then to the second server.

3. The system of claim 2, wherein the virtual machine on the second server transmits packets through the second router of the second hosting point directly to the clients without first routing to the first router of the first hosting point.

4. The system of claim 2, wherein in response to the virtual machine being migrated to the second server at the second hosting point, the second server advertises a more specific internet protocol address subnet of the virtual machine on the second server; and
  wherein the more specific internet protocol address subnet of the virtual machine on the second server is different from a previous subnet of the virtual machine when the virtual machine was on the first server.

5. The system of claim 4, wherein by switching from the previous subnet of the virtual machine when the virtual machine was on the first server to the more specific internet protocol address subnet of the virtual machine on the second server, the current traffic switches from the first route to a second route.

6. The system of claim 5, wherein the second route does not include the first router of the first hosting point.

7. The system of claim 1, wherein when the virtual machine is migrated from the first sever to the second server, the internet protocol address identifying a host network part remains the same, such that internet protocol connections previously made by the clients to the virtual machine at the first server using the host network part of the internet protocol address do not change and are not broken during and after the virtual machine is migrated from the first server to the second server.

8. The system of claim 7, wherein the interactive software running on the virtual machine is interactive online gamming software;
  wherein the clients are online game players operatively connected to the virtual machine by their internet protocol connections to the internet protocol address, the internet protocol address identifying the host network part and a subnet part;
  wherein the host network part is a conjunction of the first hosting point and second hosting point by the virtual private local area network service;
  wherein during the last round of migrating the virtual machine to the second server, the buffered packets are received by the first server when the virtual machine is no longer processing the buffered packets to play the interactive online gamming software;
  wherein the buffered packets are played first by the virtual machine migrated to the second server such that the online game players do not recognize that the virtual machine is migrated to the second server and such that the online game players continue to connect to the internet protocol address; and
  wherein the subnet of the Internet protocol address is changed from a first subnet of the first server to a second subnet of the second server, both the first and second servers being in the virtual private local area network service which is within the larger wide area network and both the first and second servers being at different geographical locations.

9. A method for migrating a virtual machine over a wide area network, comprising:
  providing a first hosting point having a first server, the first server comprising the virtual machine;
  providing a second hosting point having a second server, the second hosting point being in a different geographical location than the first hosting point, wherein the second hosting point is operatively connected to the first hosting point over the wide area network, and wherein within the wide area network the first hosting point is operatively connected to the second hosting point by a virtual private local area network service;
  wherein the virtual machine runs an interactive online gaming software on the first server;
  wherein the virtual machine on the first server communicates packets to and from clients operatively connected to the virtual machine on the first server via an internet protocol address assigned to the virtual machine;
  in response to instructions, migrating by the first server the virtual machine to the second server on the second hosting point by incrementally coping files and state of the virtual machine to the second server without interrupting the interactive software running on the virtual machine;
  wherein the first server comprises application aware software that detects an end of a game stage in the interactive online gamming software running on the virtual machine when online players in a game return to initial positions after a level;
  wherein the first server starts migration of the virtual machine for the interactive online gamming software running on the virtual machine in response detecting the end of the game stage when players in the game return to initial positions after the level;
  during a last round of migrating the virtual machine to the second server when the virtual machine temporarily stops operating, for packets intended for the virtual machine on the first server, buffering by the first server the packets in a buffer as buffered packets instead of discarding the packets,
  transmitting by the first server the buffered packets to the second server at the second hosting point; and
  sending by the second server the buffered packets to the virtual machine now migrated to and operating on the second server at the second hosting point, such that the buffered packets are played before current packets currently received from the clients are played;
  wherein the second server causes a second router, in front of the second server, to advertise a more specific internet protocol prefix via a border gateway protocol than a first router in front of the first server, the more specific internet protocol prefix encompasses the internet protocol address assigned to the virtual machine;
  wherein in response, the first server causes the first router in front of the first server to withdraw a less specific internet protocol prefix of the first router via the border gateway protocol;
  wherein the second server receives and distinguishes current packets received by the second server from the buffered packets received by the second server, in which the current packets are received from the clients and the buffered packets are received from the first server;
  wherein in response to the last round of migrating the virtual machine to the second server, the first server marks the buffered packets which were originally intended for the virtual machine on the first server, such that the second server can identify a mark of the buffered packets when the second server receives the buffered packets; and wherein at an end of the buffered packets being transmitted to the second server, the first server sends an end of buffered packets message to the second server, such that the second server knows to start playing the current packets to the virtual machine on the second server upon receipt of the end of buffered packets message in place of playing the buffered packets having the mark.

* * * * *